United States Patent [19]
Lehmusto et al.

[11] Patent Number: 6,108,551
[45] Date of Patent: Aug. 22, 2000

[54] ASSIGNING OF TRANSMISSION TURNS TO RADIO UNITS

[75] Inventors: Mika Lehmusto, Kerava; Mika Heiskari, Espoo, both of Finland

[73] Assignee: Nokia Telecommunications Oy, Espoo, Finland

[21] Appl. No.: 08/716,306

[22] PCT Filed: Mar. 21, 1995

[86] PCT No.: PCT/FI95/00150

§ 371 Date: Sep. 23, 1996

§ 102(e) Date: Sep. 23, 1996

[87] PCT Pub. No.: WO95/26613

PCT Pub. Date: Oct. 5, 1995

[30] Foreign Application Priority Data

Mar. 22, 1994 [FI] Finland ..................... 941333

[51] Int. Cl.$^7$ ..................... H04Q 7/20
[52] U.S. Cl. ............ 455/450; 455/11.1; 455/522; 455/67.1
[58] Field of Search ............ 455/11.1, 15, 522, 455/450, 452, 455, 509, 515, 516, 67.1, 67.6, 69; 370/260, 349

[56] References Cited

U.S. PATENT DOCUMENTS

| 4,534,061 | 8/1985 | Ulug ........................... 455/17 |
| 5,166,929 | 11/1992 | Lo ........................... 375/85.3 |
| 5,212,805 | 5/1993 | Comroe et al. ............ 455/33.1 |
| 5,247,701 | 9/1993 | Comroe et al. ............ 455/33.4 |
| 5,274,838 | 12/1993 | Childress et al. ............ 455/9 |
| 5,282,204 | 1/1994 | Shpancer et al. ............ 370/94.2 |

FOREIGN PATENT DOCUMENTS 35 08 900  9/1986  Germany .

Primary Examiner—Daniel S. Hunter
Assistant Examiner—Darnell R. Armstrong
Attorney, Agent, or Firm—Pillsbury Madison & Sutro LLP

[57] ABSTRACT

The present invention relates to a method and radio unit for assigning transmission turns to a radio unit (RU2) wishing to operate on a direct mode channel (f1). To assign the transmission turns in a controlled manner, said radio unit (RU2) monitors the quality of the traffic (101) conducted on the direct mode channel, and if the quality of the traffic (101) falls below a predetermined value, said radio unit (RU2) starts to transmit its transmission (120) on said direct mode channel.

7 Claims, 3 Drawing Sheets

ASSIGNING OF TRANSMISSION TURNS TO RADIO UNITS

This application claims benefit of International application PCT/Fl95/00150, filed Mar. 21, 1995.

FIELD OF THE INVENTION

The present invention relates to a method for assigning transmission turns to a radio unit that operates on a direct mode channel.

BACKGROUND OF THE INVENTION

The invention relates to the field of radio phone systems. A subscriber in a radio phone system, i.e., a radio unit or a subscriber station, for instance a radio phone or some other means of communication, may be registered in a radio network or system, whereby it is registered in the radio network via system and traffic channels maintained by the base stations of the radio network.

In addition to the system channels in radio phone systems, so-called direct mode channels can also be used in connection with a radio system, i.e., direct mode operation is applied. Radio units or subscriber stations using direct mode operation do not communicate directly with the radio network or its base stations. Direct mode channels are frequencies at which radio phones or other means of communication are able to communicate directly with each other without the system.

Direct mode channels are typically used in situations where, for instance a group of portable radio phones communicate with each other at such a distance from the base station that system channels cannot be used.

Another important way of using direct mode channels is to increase the capacity when the traffic in the system increases fast in some part of the service area of the system, for instance, in some point-like part of the radio network.

A direct mode channel is referred to as a direct or simplex channel, or a simplex connection. A direct mode channel is a channel which is not typically used by the system. It may be, for instance, a channel of the breadth of the channels of the system, for instance 12.5 kHz or 25 kHz. Among the radio phones operating on a direct mode channel, the transmitting station has tuned its transmitter to the channel and transmits speech or data information. The other radio phones set to direct mode operation have tuned their receivers to the same channel, whereby they are able to directly hear the transmission.

Operation on a direct mode channel may take place on the analog or digital modulation principle. A radio phone transmitting on the channel may also transmit signalling information, such as information on rights of use and priorities or on the group operating on the channel. On the direct mode channel, an encryption may be carried out or plain speech can be transmitted.

Radio units or subscriber stations using direct mode operation communicate with other radio units on a direct mode channel without necessarily being in direct contact with the base stations of the radio network.

One form of a direct mode channel is a direct mode channel equipped with a repeater. Such a direct mode channel includes a separate repeater station in addition to the subscriber stations which forwards traffic between the subscriber stations using the direct mode channel. A repeater station is one type of radio unit. The traffic on the direct mode channel, thus, takes place on the semiduplex principle. The subscriber stations using direct mode operation can also communicate with the radio network via repeater stations.

The random access method used in prior art radio phones capable of using direct mode operation is very simple. It is entirely based on the pushes of a tangent performed by users. When the user of a radio unit depresses his tangent, i.e., the push-to-talk button (PTT), the radio unit transmits its signal to the direct mode channel, i.e., the radio path. It is obvious that a signal given by a speech detector can correspond to a push of a tangent.

The problem with the solution according to prior art is that if one radio unit sends out a transmission simultaneously with another radio unit, the signals of both radio units are usually destroyed or corrupted, and the transmission of neither radio unit reaches its destination.

Naturally, due to the above-mentioned reason, the efficiency of channel use is not high in prior art solutions because the systems waste radio path capacity.

DESCRIPTION OF THE INVENTION

An object of this invention is to solve the problems associated with the prior art solutions.

An object of the invention is to provide a method, i.e. a protocol, with the use of which the transmissions of radio units, such as subscriber stations, operating on a direct mode channel do not accidentally coincide.

An object of the invention is to improve the operational efficiency of the channels, i.e., frequencies, of radio units operating on direct mode channels.

A method for assigning transmission turns to radio units operating on a direct mode channel includes a radio unit that monitors the quality of the traffic conducted on the direct mode channel, and if the quality of the traffic falls below a predetermined value, the radio unit starts to transmit on the direct mode channel.

The invention further relates to a radio unit: operating on a direct mode channel, comprising a transceiver unit for receiving transmissions transmitted by other radio units and for transmitting transmissions to said other radio units, a control unit for controlling the functions of the radio unit and a user interface. The radio unit of the invention is characterized in that it further comprises monitoring means of the quality of transmissions responsive to the transmissions transmitted by other radio units for monitoring the quality of the transmissions of said other radio units and for generating a signal proportional to the quality, and comparing means responsive to the monitoring means for comparing the quality of the received transmissions with predetermined criteria and for starting the transmission of the transmissions of the radio unit when the quality of the received transmissions falls below the criteria.

The invention is based on the idea that the radio unit which desires to transmit its own transmission to a destination via a direct mode channel monitors the operation conducted on the direct mode channel. The radio unit monitors how close another radio unit operating on the direct mode channel is located and whether it is transmitting information. This monitoring is carried out by monitoring the quality of the transmissions of the radio units operating on the direct mode channel. The radio unit can estimate whether the transmission of another radio unit is so disturbing that it is not advantageous to said radio unit to transmit its own transmission simultaneously but to wait until the other radio unit has completed its transmission. Another way of assigning transmission turns on a direct mode channel is one where the radio unit monitors the signalling messages transmitted by another radio unit in its transmission and estimates based on these messages when it is the convenient moment to start transmitting its own transmission on the direct mode channel.

The invention relates to a method and a radio unit, such as a subscriber station, operating according to the method. The radio unit can transmit signals or speech when it so desires on a direct mode channel, i.e., by using direct mode operation, when operating according to this method. The radio unit thus obtains a transmission turn by using the random access method, that is partly controlled, whereby the disturbance caused by the transmission for other radio phones remains the smallest possible.

An advantage of this method for assigning transmission turns to radio units operating on a direct mode channel and the radio unit is that the problems associated with the prior art solutions are solved. The method and radio unit of the invention enable the radio communication of several radio units on a direct mode channel so that the transmissions of the radio units do not coincide on the direct mode channel. This way the transmission of no radio unit is destroyed. To put it briefly, the method and radio unit of the invention enable the transmission turns of radio phones on a direct mode channel to be controlled in such a manner that the transmissions of the radio units do not interfere with one another.

Another advantage of the invention is that the same channel can be used by several radio unit groups, even if these groups are located on the same channel close to one another or a distance apart.

Further, the invention has the advantage that the controlled transmission turn assignment method of the invention guarantees a more reliable method than the transmission principle based on the user's free choice.

Furthermore, the controlled transmission turn assignment method of the invention produces a better channel use efficiency, because the messages transmitted over the radio path are not easily destroyed and that it is not necessary to make several transmission attempts to transmit the same transmission via the direct mode channel.

Yet another advantage of the invention is that it enables transmission turns to be assigned to radio units operating on a direct mode channel on the basis of the priorities of these units or the priorities of the transmissions of these units in such a manner that the transmissions of the radio units having a higher priority or the transmissions having a higher priority are transmitted on the direct mode channel before other transmissions or transmissions of other radio units. This results in the fact that a radio unit or a transmission of a higher priority has a higher probability of obtaining a transmission turn and thus a statistically higher probability of getting a transmission quickly on the radio path.

BRIEF DESCRIPTION OF THE DRAWINGS

The invention will be described in more detail with reference to the accompanying drawings.

DETAILED DESCRIPTION OF THE INVENTION

Figure 1:
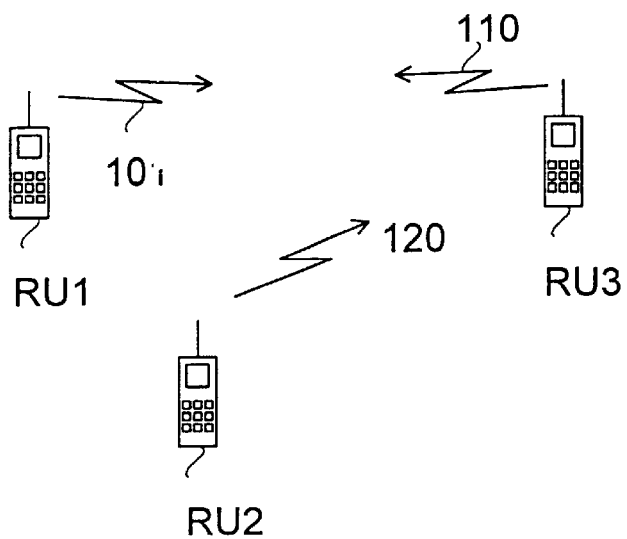
FIG. 1 shows the operation of the radio units of the invention on a direct mode channel.

FIG. 1 shows the operation of the radio units RU1, RU2, RU3 of the invention on a direct mode channel. These radio units may be mobile stations or any entities provided with a radio equipment that are capable of operating on a direct mode channel. The radio units may also be base stations or repeater stations of mobile communication systems. The radio unit of the invention operates so that when there is no traffic on the direct mode channel, each radio phone may freely select the moment when to send out a transmission on the channel. This can be done when a sufficiently long period of time has elapsed from the last burst, i.e., the transmission of a radio unit, transmitted on the direct mode channel. When a second radio unit RU2 operating according to the invention desires to transmit its transmission on the direct mode channel, this radio unit RU2 checks whether a signal of some other radio unit, such as a first radio unit RU1, that exceeds a given quality level, is already being transmitted on the channel. The quality of a signal or transmission being transmitted on the direct mode channel is indicated, for instance, by the field strength, bit error rate, or block error rate of this signal. The bit error rate refers to the rate Ne/No, where No is the number of received bits and Ne is the number of bits among these received bits in which the error detection method has detected an error. Correspondingly, the block error rate refers to the rate $N_E/N_O$, where $N_O$ is the number of received messages and $N_E$ is the number of messages among these received messages in which the error detection method has detected an error of at least one bit. Of course, the quality of a signal, especially its field strength, correlates with the distance between the radio units operating on the direct mode channel.

In a first embodiment of the invention, the second radio unit RU2 monitors the quality of a transmission transmitted on the direct mode channel by using the criteria and the threshold values relating to them mentioned in the preceding paragraph so that when the quality of the transmission transmitted on the direct mode channel falls below one of these selected criteria, the second radio unit RU2 starts to transmit its own transmission on the direct mode channel, because this second radio unit concludes that based on the quality of the received transmission that the radio transmitter which had transmitted earlier, i.e., the disturbing radio transmitter, is located so far from the second radio unit that this first radio unit does not disturb the operation of the second radio unit on the direct mode channel. The transmission of the second radio unit starts either immediately after it has noticed that the quality of the transmission of the first, i.e. the disturbing, radio unit has fallen below a certain criterion, or after a desired delay. If, however, there is other traffic meeting these quality criteria on the direct mode channel, the second radio unit RU2 waits its turn to transmit until there is no longer other traffic on the direct mode channel. This embodiment is currently a preferred embodiment of the invention, and the transmission quality monitoring and evaluation according to it are always performed when operating in the manner according to the invention.

In a second embodiment of the invention, the first subscriber station RU1, i.e., the subscriber station already operating on the direct mode channel, adds, to the end of its transmission 101, a notification indicating the end of the transmission. The second radio unit RU2 waits before starting its transmission until it receives the notification indicating the end of the transmission transmitted by the first radio unit RU1, after which the second radio unit starts its transmission immediately or after a desired delay.

In a third embodiment of the invention, the first radio unit RU1, i.e., the radio unit already operating on the direct mode channel, adds to its transmission 101 an acknowledgement request signal commanding a third radio unit RU3, which receives the transmission of the first radio unit, to transmit an acknowledgement, which indicates, for instance, the successful or unsuccessful receipt of the transmission from the first radio unit RU1. Now also the second radio unit RU2, which would like to have a transmission turn, listens to the transmission of the first radio unit RU1 and before its own transmission turn, checks the transmission of the first radio unit as to whether the acknowledgement request signal has appeared, and will not transmit before a suitable period of time has elapsed from the acknowledgement request signal transmitted by the first radio unit RU1. The transmission time Ttrans of the second radio unit in relation to the presence of the acknowledgement request signal on the direct mode channel can be calculated for instance in the following manner: $T_{ack}+T_{margin}+T_{rnd}$=Ttrans, where the first two terms represent the time required by the acknowledgement and the guard period. $T_{rnd}$ is a randomly selected additional time dependent on the priority.

In a fourth embodiment of the invention, the second radio unit RU2, which desires to transmit its transmission on the direct mode channel, waits before transmitting its own transmission 120 until the second radio unit RU2 receives, on the direct mode channel, the acknowledgement message 110 transmitted by the third radio unit RU3 to the first radio unit. By means of the acknowledgement message 110, the third radio unit RU3 indicates, for instance, the successful or unsuccessful receipt of the transmission 101 from of the first radio unit RU1. Also in this case, the second radio unit can start its own transmission either immediately or after a desired delay.

It should be noted that in all these embodiments of the invention, the start of the transmission by the second radio unit can be performed either immediately after the obstruction on the direct mode channel has disappeared or after a desired period of time. This desired period of time can be calculated based on the priority of the radio unit desiring, and taking, a transmission turn, i.e., the second radio unit, or based on the priority of the intended transmission of this radio unit. Furthermore, this desired period of time can be calculated within the time limits determined by the above-mentioned priorities, but, however, randomly so that the actual transmission starting instant is randomly determined. This can be carried out by using the procedure shown in FIG. 2.

Figure 2:
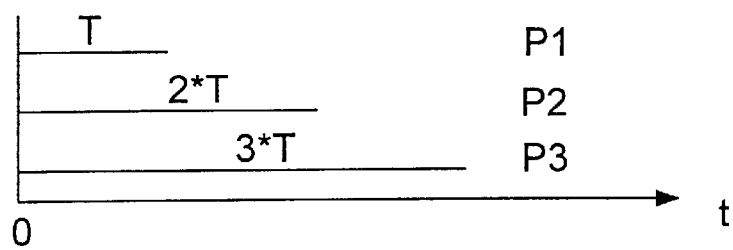
FIG. 2 is a delay calculation diagram according to the invention, where a transmission start delay is used in calculating priorities.

FIG. 2 shows the effect of the priority of a radio unit or that of its transmission on the transmission starting instant of this radio unit. At t=0, the transmission on the direct mode channel ends, or the quality of an earlier transmission on the direct mode channel falls below a given criterion. Furthermore, it is possible that at t=0, some other obstruction existing on the direct mode channel ceases to exist, for instance the third radio unit transmits its acknowledgement at that time. Thus, according to FIG. 1, the radio units, or in this case, the second radio unit, starts its own transmission at the instant randomly selected by it so that if the radio unit's own priority or that of its transmission is P1, the radio unit randomly selects the transmission instant from the period of time T, and if the priority is P2, the radio unit randomly selects the transmission instant from the periods of time 2*T and further 3*T. The radio units of a higher priority (P1) thus have a higher probability of a transmission turn, which is statistically shown as a quicker access to the channel. Of course, this manner of determining the transmission instant by means of priorities is merely an example. There are also other ways of determining the transmission instant, but they are however applied in such a manner that one remains within the scope determined by the claims.

Figure 3:
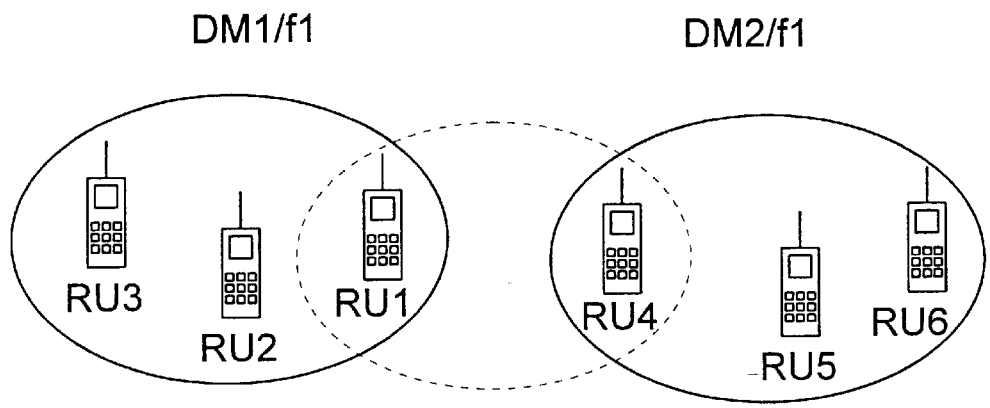
FIG. 3 is a diagram of a situation where two radio unit groups operate simultaneously on the same direct mode channel.

FIG. 3 shows a situation where groups DM1 and DM2 operate on the direct mode channel f1, radio units RU1–RU3 belonging to the group DM1 and radio units RU4–RU6 belonging to the group DM2. All these radio units operate on the same direct mode channel f1. In the figure, the transmissions sent from the group DM1 and received at the group DM2 are very low-powered, i.e., below the threshold value parameter. Thus, according to the invention, since the radio units RU1 and RU4 select their transmission instant based on the quality, typically the field strength, of a transmission received by them so that the radio units send out a transmission if the quality of the received transmission falls below the threshold value,. both radio units RU1 and RU4 can still send out transmissions simultaneously to their own group on the same direct mode channel. Accordingly, two (or more) different groups DM1, DM2, which are located far from each other, can use the same channel f1. Since a signal of a low quality/power (below the threshold value) on the direct mode channel does not prevent the decoding of a stronger signal, the transmission of the radio unit RU1, RU4 can start independently of other signals. If the groups approach each other and the power of a crosstalk signal increases, the radio phone which was waiting its transmission turn must refrain from sending out a transmission once the threshold value has been exceeded.

As an exception, a signal of a low quality/power falling below the threshold value (this signal originating, for instance, from a neighboring group) can also be decoded, when signals exceeding the threshold value, originating, for instance, from a radio unit's own group, do not exist on the channel.

Figure 4:
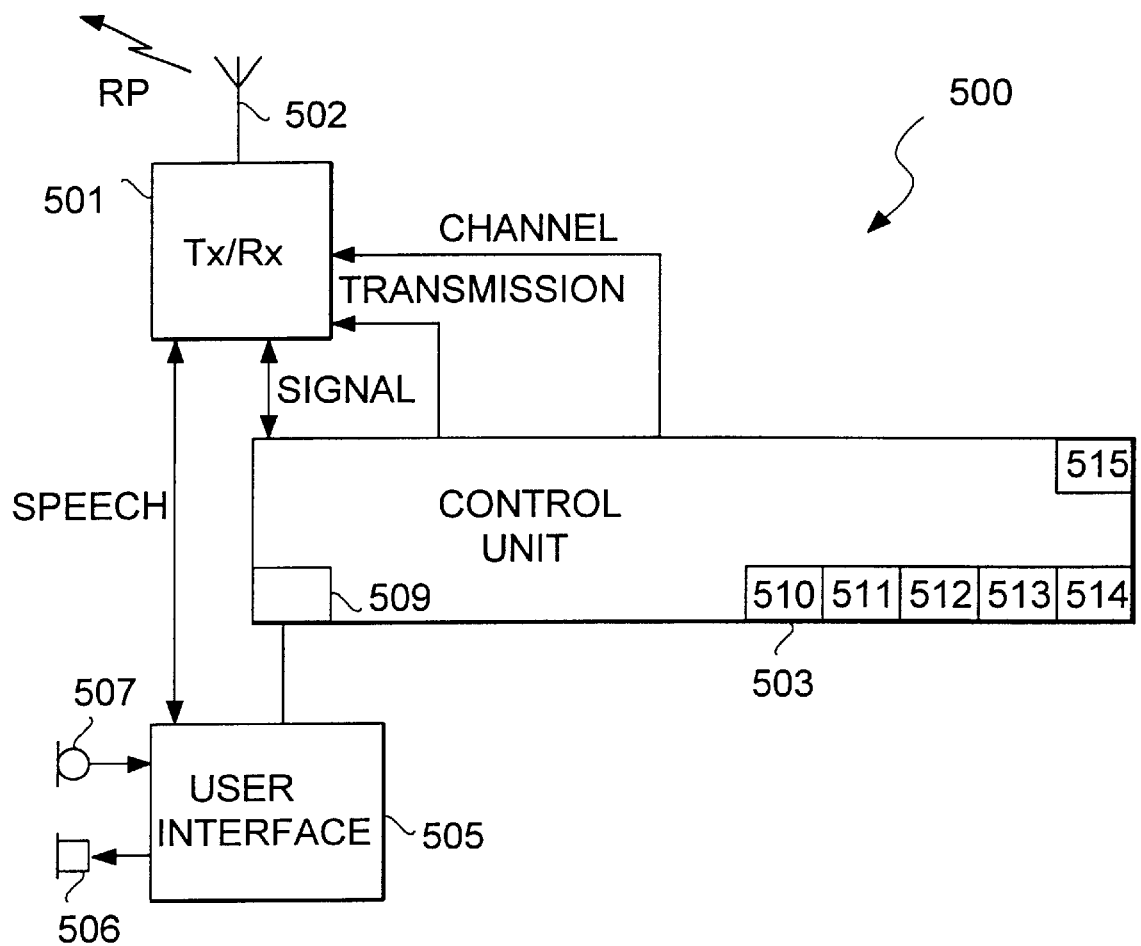
FIG. 4 is a block diagram of a radio unit of the invention.

FIG. 4 shows a block diagram of a radio unit of the invention. The figure shows a typical radio unit 500 operating on a direct mode channel, i.e., a radio phone used by a subscriber, a mobile station or, for instance, a subscriber station. The purpose of a transceiver (TX/RX) 501 is to tune to the radio channel used in each particular case. An antenna 502 is connected with the transceiver 501, and the radio path RP. Radio frequencies in the range of 60 to 1000 MHz (VHF and UHF ranges) are usually used, even though other frequencies can also be used. On the radio path RP, analogue modulation can be used. The modulation is then usually phase modulation. Other kinds of modulation can also be used. Signals can be transmitted, e.g., by a voice-frequency subcarrier (FFSK). Transmission on a radio path can also be digital.

A user interface 505 comprises electroacoustic transducing means, typically a headphone 506 and a microphone 507, and optionally buttons for starting and ending a call, and for dialing. Since in a trunking system and especially on a direct mode channel, transmission on a radio path RP is advantageously unidirectional, the user interface usually also has a push-to-talk button, which must be depressed when transmitting. The push-to-talk button is not shown in FIG. 4.

The task of a control unit 503 is to control operation of the radio unit. The control unit 503 is connected with the user interface 505, from which it receives impulses, e.g., for starting and ending a call. The control unit 503 may also give the user, via the user interface 505, voice or visual signals that relate to the operation of the radio phone and/or the radio telephone system.

The control unit 503 is connected with the transceiver TX/RX 501. The channel employed by the transceiver is determined by the control unit 503, i.e., the transceiver 501 tunes to the channel determined by the control unit 503, i.e., to a radio frequency and a suitable time slot. The radio unit of the invention is able to tune to a direct mode channel. The transceiver 501 is also switched on by the control unit 503. The control unit 503 receives and transmits signals via the transceiver 501. The radio unit 500, RU1–RU6 (FIGS. 1 and 2) of the invention operating on a direct mode channel can be used, for instance, in a radio system comprising a radio network with at least one base station and subscriber stations and possibly one or more repeater stations, which forward traffic between at least one base station and subscriber stations operating on the direct mode channel. This radio unit thus comprises the transceiver unit 501 for receiving transmissions transmitted by other radio units and for transmitting transmissions to said other radio units, the control unit 503 for controlling the functions of the radio unit, and the user interface 505.

The radio unit 500, RU2 of the invention further comprises monitoring means 509 of the quality of transmissions 101 responsive to the transmissions transmitted by other radio units RU1 for monitoring the quality of the transmissions of said other radio units RU1 and for generating a signal proportional to said quality. The radio unit of the invention further comprises comparing means 510 responsive to said transmission monitoring means 509 for comparing the quality of the received transmissions with predetermined criteria and for starting the transmission of the transmissions 120 of said radio unit when the quality of the received transmissions falls below said criteria.

In the radio unit of the invention, the monitoring means 509 monitors the field strengths, bit error rates or block error rates, of the transmissions transmitted by other radio units and received by the radio unit.

The radio unit 500 of the invention further comprises a decision-making means 511 responsive to the signals indicating the end of transmission transmitted by other radio units RU1 for starting the transmission of the radio unit 500, RU2.

The radio unit 500 of the invention further comprises a decision-making means 512 responsive to the acknowledgement request signals transmitted by other radio units RU1 for starting the transmission of said radio unit after a delay. The calculation of this delay is described in more detail in connection with the description of FIGS. 1 and 2.

The radio unit 500 of the invention further comprises a decision-making means 513 responsive to the acknowledgements 110 (FIG. 1) transmitted by other radio units R3. The acknowledgements indicate the successful receptions of transmissions. The decision-making means starts the transmission 120 of the radio unit.

The radio unit of the invention further comprises delaying means 514 responsive to the decision-making means 511, 512, 513 for delaying the transmission of the transmissions 120 of the radio unit RU2, 500 on the basis of the priority of the radio unit RU2, 500.

The radio unit RU2, 500 of the invention further comprises delaying means 515 responsive to the decision-making means 511, 512, 513 for delaying the transmission of the transmissions of the radio unit on the basis of the priority of the transmission 120 of the radio unit RU2, 500.

In the radio unit RU2, 500 of the invention, the delaying means 514, 515 delay the transmission of the transmissions of the radio unit RU2, 500 randomly within the time limits determined by said priorities.

Figure 5:
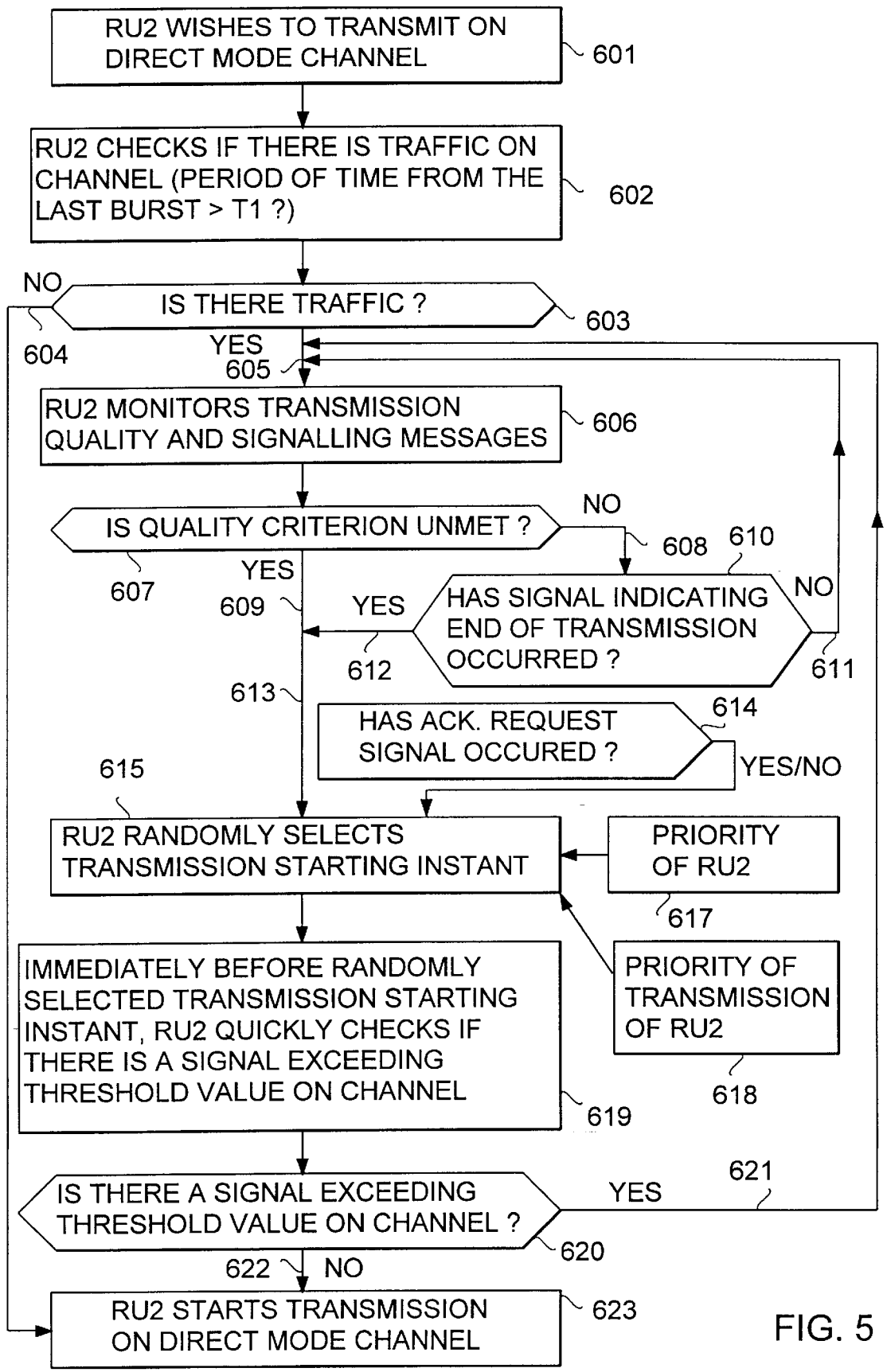
FIG. 5 is a flow diagram of the functions of the method and radio unit of the invention.

FIG. 5 shows a flow diagram of the functions of the method and radio unit of the invention. The operation of the method of the invention starts at stage 601, where the radio unit RU2 desires to transmit its own transmission on a direct mode channel. After this, the radio unit RU2 checks 602 whether there is traffic on the direct mode channel on which this radio unit would like to operate, i.e., to transmit its own transmissions. During this check, it is possible to monitor, for instance, if a desired period of time, for instance, the period of time T1, has elapsed from the previous transmission, i.e., burst, transmitted on this direct mode channel. If there has been no traffic on the direct mode channel after the period of time T1 and if there is no 604 traffic at the moment of monitoring either, the radio unit starts transmission 623 on the direct mode channel. If, however, there is 605 traffic on the direct mode channel, the radio unit monitors 606 the quality of the transmission transmitted on the direct mode channel and the signals included in these transmissions. The quality monitoring and signals monitoring have been described in connection with the description of FIG. 1. At the next stage, a decision 607 is made on whether the quality criterion is not met. If the quality criterion is met 608, it is observed whether a signals indicating that the radio unit RU2 can start its transmission has occurred. This signals may be, for instance, a notification indicating the end of transmission or an acknowledgement signal. If this type of signal has not occurred, stage 606 is returned 611 to, i.e., to monitor the quality of received transmissions and new signals. If, however, a notification indicating the end of transmission has occurred or the quality criterion has not been met 609, the operation of the method shifts to stage 615, where the radio unit generates a random number, thus randomly selecting the next transmission instant for itself. Before this, it is alternatively possible to examine 614 whether an acknowledgement request signal has occurred in the signal on the direct mode channel. If an acknowledgement request signal has occurred, the delay caused by it to the start of transmission is taken into account at stage 615, where the next transmission instant of the radio unit is determined. Correspondingly, if no acknowledgement request signal has occurred, the operation of the method shifts directly to stage 615. In the implementation of stage 615, the necessary priorities are taken into account, for instance the radio unit's RU2 own priority 617 or/and the priority of the transmission of the radio unit RU2, and the period of time required by a possible acknowledgement. The effect of these priorities on the selection of a transmission instant is described in more detail in connection with the description of FIG. 2. After stage 615, the operation of the method shifts to stage 619, where the radio unit RU2 quickly rechecks 620 immediately before the transmission if there is traffic, i.e., a signal exceeding the threshold value, on the direct mode channel intended to be used. If this signal exists 621, the operation of the method returns to stage 605, i.e., the monitoring of the quality of transmission and signalling messages is restarted. If, however, no signal exceeding the threshold value is found 622 as a result of the recheck 619, the radio unit starts 623 transmission on the direct mode channel.

The drawings and the description relating thereto are only intended to illustrate the idea of the invention. In their details, the method of the invention for assigning transmission turns to radio units operating on a direct mode channel and the radio unit may vary from the scope of the claims. Even though the invention has been described above mainly in connection with trunking radio systems, the invention can also be used in other types of mobile communication systems.

What is claimed is:

1. A method for assigning transmission turns to a radio unit that operates on a direct mode channel, said method comprising:

said radio unit monitoring a quality of traffic on said direct mode channel, when said radio unit wishes to transmit on said direct mode channel; and if said quality of said traffic falls below a predetermined value, said radio unit transmitting on said direct mode channel;

wherein, immediately before transmitting, said radio unit checks that there is no traffic on said direct mode channel of which said quality exceeds said predetermined value.

2. A mobile radio unit operating on a direct mode channel, comprising:

a transceiver unit for receiving transmissions transmitted by other mobile radio units and for transmitting to said other mobile radio units on said direct mode channel;

a control unit for controlling functions of the mobile radio unit;

a user interface;

means for monitoring quality of the received transmissions of said other mobile units on said direct mobile channel and for generating a signal proportional to said quality; and comparing means responsive to said transmission monitoring means for comparing the quality of the received transmissions on said direct mobile channel with predetermined criteria and, when the quality of the received transmissions falls below said criteria, initiating transmission by said radio unit on said direct mobile channel after a random delay, when said radio unit wishes to transmit on said direct mode channel.

3. The radio unit as claimed in claim 2, wherein said monitor monitors field strengths of transmissions of said other radio units.

4. The radio unit as claimed in claim 2, wherein said monitor monitors bit error rates of transmissions of said other radio units.

5. The radio unit as claimed in claim 2, wherein said monitor monitors block error rates of transmissions of said other radio units.

6. The radio unit as claimed in claim 2, said radio unit further comprising:

a decision-maker, responsive to signals indicating an end of said transmissions by said other radio units, which starts transmission by said radio unit.

7. A mobile radio unit operating on a direct mode channel, comprising:

a transceiver unit for receiving transmissions transmitted by other mobile radio units and for transmitting to said other mobile radio units on said direct mode channel;

a control unit for controlling functions of the radio mobile unit; and a user interface; wherein said control unit monitors the quality of the received transmissions of said other mobile radio units on said direct mode channel and generates a signal proportional to said quality, and when said signal proportional to said quality falls below a predetermined criteria, preparing the mobile radio unit, after a random delay, to start transmission by said mobile radio unit on said direct mode channel; wherein said control unit checks whether there is a transmission by said other mobile radio units on said direct mode channel during said random delay, and prevents transmission of said mobile radio unit after said random delay if transmission by said other mobile radio units is detected on said direct mode channel during said random delay, when said radio unit wishes to transmit on said direct mode channel.

* * * * *